Feb. 10, 1953 P. A. TRAPP 2,628,132
WHEEL CONSTRUCTION
Filed July 29, 1947 2 SHEETS—SHEET 1

INVENTOR.
Patrick A. Trapp
BY Lancaster, Allwine & Rommel
ATTORNEYS.

Feb. 10, 1953 P. A. TRAPP 2,628,132
WHEEL CONSTRUCTION
Filed July 29, 1947 2 SHEETS—SHEET 2

INVENTOR.
Patrick A. Trapp
BY
ATTORNEYS.

Patented Feb. 10, 1953

2,628,132

UNITED STATES PATENT OFFICE 2,628,132

WHEEL CONSTRUCTION

Patrick A. Trapp, Butte, Mont.

Application July 29, 1947, Serial No. 764,409

15 Claims. (Cl. 301—9)

This invention relates to improvements in automotive wheel constructions.

The primary object of this invention is the provision of an improved and relatively simple manner of detachably securing the wheel of an automotive vehicle upon an axle flange or drum.

In the conventional automotive wheel structure there are provided at least five bolts and nuts each of which must be individually attended to in order to attach or detach an automotive vehicle wheel with respect to the axle structure. It is the purpose of this invention to provide a relatively simple structure with means for securing the wheel in about the same relative location to the axle flange or drum but with a single operating bolt controlling the attachment or detachment of the connecting means.

Other objects and advantages of this invention will be apparent during the course of the following detailed description.

In the accompanying drawings forming a part of this specification, and wherein similar reference characters designate corresponding parts thruout the several views—

Figure 1:
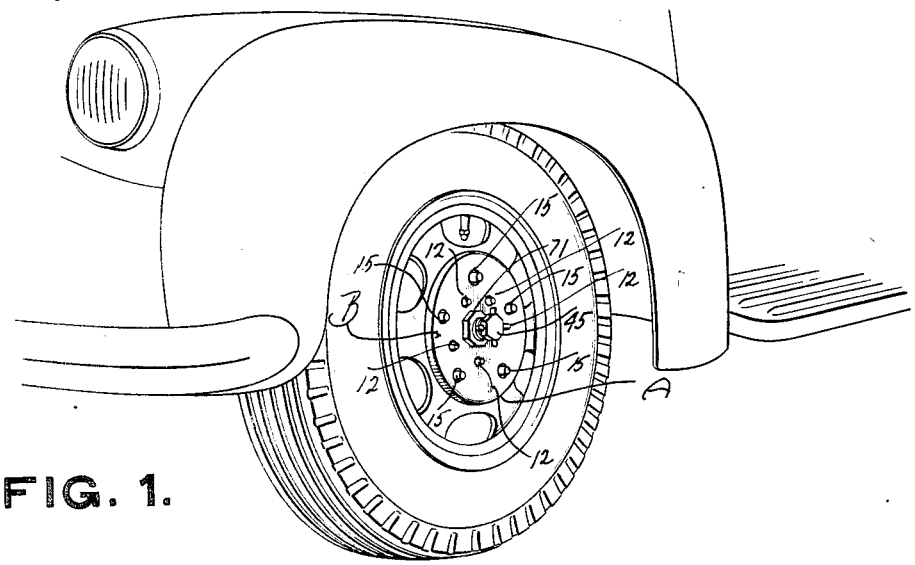
Figure 1 is a fragmentary perspective view of a vehicle wheel showing the improved connecting structure of the wheel for attachment to an axle or axle flange.
Figure 2:
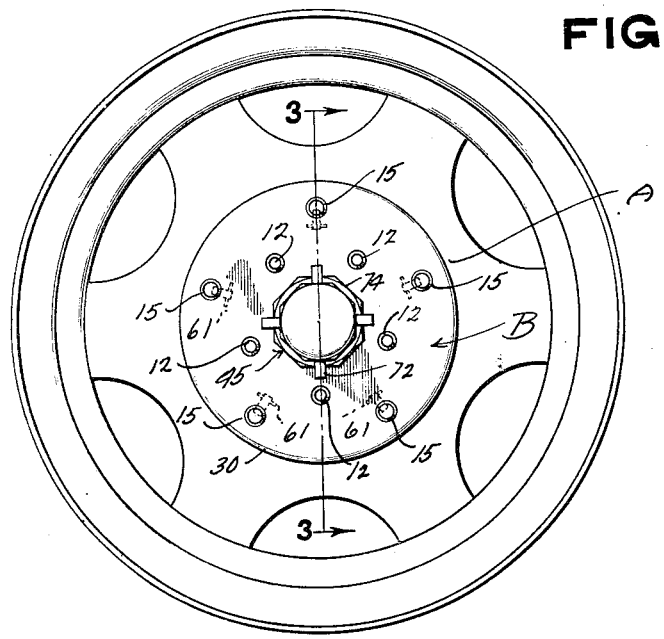
Figure 2 is a side elevation of the wheel and its associated structure.

In the drawings, wherein for the purpose of illustration are shown preferred and modified forms of the invention, the letter A may generally designate an automobile wheel having improved means B associated therewith to insure quick and sturdy connection of the wheel A to the axle drum or flange C.

The wheel A may be of any approved type and the center plate portion 10 thereof is provided with five, preferably tapered openings 11, to receive certain positioning studs 12 of the axle drum or flange C to be subsequently mentioned. Radially beyond and in staggered relation with respect to the openings 11 are provided another series of five, preferably tapered openings 14 to receive detent studs 15 of the axle flange C. These openings are spaced from the axis of the wheel about the same distance as the conventional bolts of an automobile wheel.

The part C may be a drum, flange or other structure of the vehicle to which the wheel is to be attached so as to rotate therewith. In some cases the flange C may be attached to the axle 20 (Figure 3), or in other cases the flange C may have the spindle structure 21 extending therethrough to the outer face of the flange, as shown in Figure 4.

Figure 5:
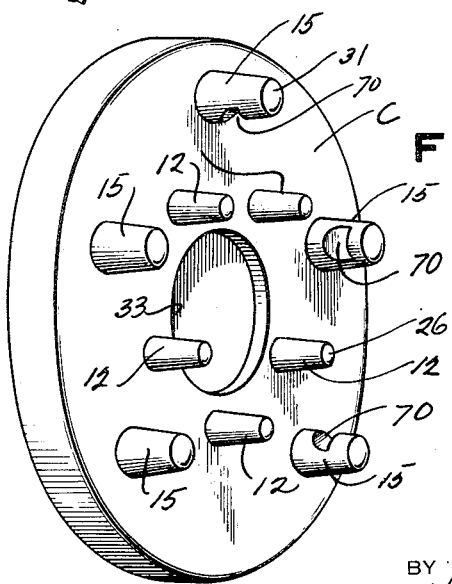
Figure 5 is a perspective view of the structure of the axle drum or flange.

The structural inventive feature of the flange C is shown in Figure 5, where the studs 12 project normal from the face of the flange C. They are tapered convergently to their outer ends where the surfaces 26 are convexly rounded to facilitate insertion into the openings 11 of the wheel plate 10 and with openings 36 of the attaching or master plate 30 of the attaching structure B to be subsequently described. The detent studs 15 are convergently tapered from their right-angled connection, preferably integral, with the flange C, and at their outer end surfaces 31 they are rounded convexly to facilitate entrance into the openings of the wheel and the attaching or master plate 30. The outer face of the flange C is provided with a pocket or depression 33 for a purpose to be subsequently described.

Figure 3:
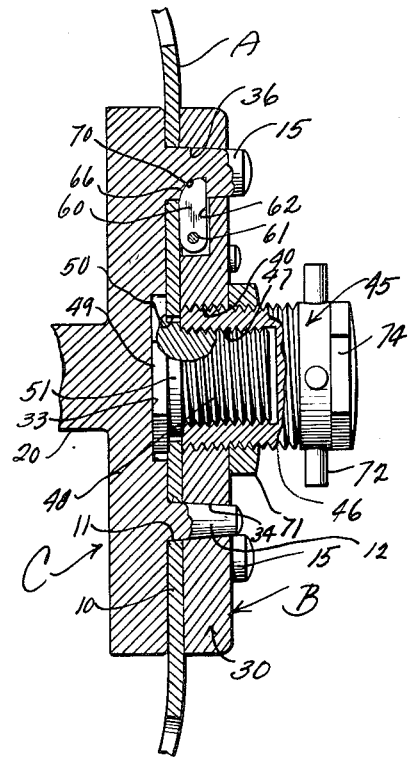
Figure 3 is a cross sectional view taken thru the improved wheel attaching structure showing it in connected position upon a wheel plate or hub.
Figure 4:
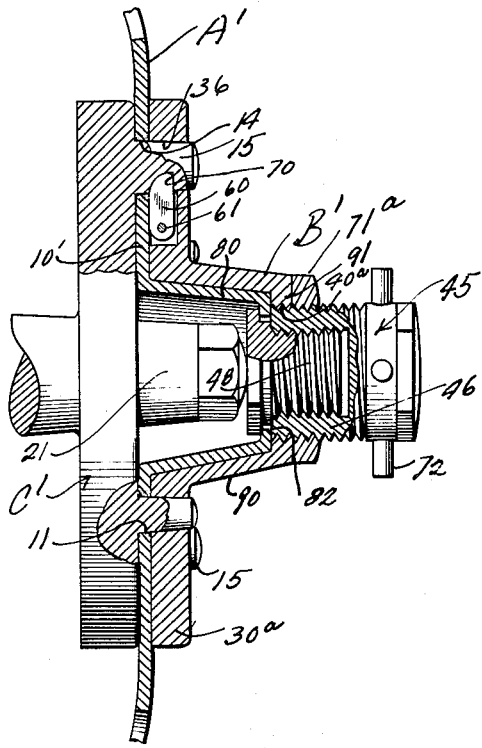
Figure 4 is a modified form of the invention associated with the type of axle having a spindle which extends thru the wheel drum or flange.

Referring to the master plate 30 for the form of invention shown in Figure 3 of the drawings, the same is preferably a sturdy flat metal plate having transverse openings 34 therethrough to receive the anchoring or positioning studs 12, and having tapered openings 36 therethrough to receive the detent studs 15. The attaching or master plate 30 centrally is provided with a screw threaded opening 40 to receive a bolt structure 45 rotatably mounted axially upon the wheel A and projecting normal thereto. The bolt 45 consists of a main bolt portion 46 internally screw threaded at 47 for receiving a connecting bolt 48. The latter is provided with a head 49 and a spacing shoulder 51 adjacent thereto. The latter extends through the opening 50 in the center of the wheel A with the head 49 at the inside surface of the wheel and the threaded shank of the bolt 48 is connected in the opening 47 of the bolt 46. The latter at its inner end clamps against the shoulder 51 and this provides an annular passageway at the inner end of the bolt structure 45 which receives the central marginal portion of plate 10 surrounding the opening 50 so that the bolt structure 45 may rotate freely upon the wheel A without any appreciable movement axially with respect to the wheel A. The head 49 is received in the pocket 33 which is of such diameter so as not to permit disconnection of the two bolts 46 and 48 upon turning the latter.

The attaching or master plate 30 is provided with pivoted detents or dogs 60 for each of the detent studs 15. They are pivoted upon pins 61 secured transversely across recesses 62 provided inwardly from the inside face of the plate 30 adjacent to and opening in each of the openings 36. The dogs or detents 60 have rounded outer ends at 66 and they are so placed in the recesses 62 that when the master plate is detached from the detent studs the rounded ends 66 will cam against the outer surface of the wheel center plate 10.

The external screw threads of the bolt 46 may receive a jumb nut 71 and the outer end thereof may be provided with laterally extending pins 72 to receive a spanner wrench or blows of a hammer head to loosen the bolt. A wrench head 74 may also be provided.

In the modified form shown in Figure 4, the wheel A' accommodates that type of wheel attaching part of the vehicle having a spindle 21 projecting from the flange C'. The wheel plate 10' is provided with a central casing 80 around the spindle structure 21 having a plate or flange portion 82 upon which the bolt structure 45, which is of the same construction as the bolt structure 45 for the form shown in Figure 3, is mounted for rotation. Similar reference characters have been given the bolt structure 45 in both forms shown in Figures 3 and 4, and that is also true of the stud and detent structures. The master or attaching plate 30ᵃ of the form shown in Figure 4, however, is provided with a central casing or hub extension 90 having an outer flanged portion 91 which is screw threaded at 40ᵃ to receive the master bolt and against which the jamb nut 71ᵃ engages.

For the parts shown in their wheel attaching position of Figures 3 and 4, it is merely necessary for an operator, in order to disconnect the wheel from the axle flange or drum, to loosen the jamb nut 71 or 71a, as the case may be, and turn the bolt 45 to move the attaching or master plate away from the wheel plate. In this connection the bolts 46 and 48 rotate together as a single bolt structure in both forms of the invention. This permits the detents 60 to drop from the detent stud recesses 70 at their outer ends, and when they are entirely removed from the stud recesses the wheel, together with the attaching structure B, may be removed from the axle flange or drum C, as is quite apparent. Preferably the master or attaching plate 30 remains attached to the central part of the wheel plate and in order to effect a connection of the parts, it is merely necessary to slip the wheel plate onto the flange C with the studs 12 and 15 in the respective openings of the attaching or master plate and upon rotation of the bolt structure 45 the detents 60 will be cammed at the edges 66 against the outer face of the wheel plate until their ends extend into the detent stud recesses 70. When the master plate is tight against the outer face of the wheel plate the jamb nut may be moved along the bolt structure to hold the position of the wheel plate. The studs 12 are sufficiently long to hold the master or attaching plate 30 against turning with the bolt structure 45 until the detents have been removed to position where the wheel may be detached from the axle flange.

Various changes in the shape, size and arrangement of parts may be made to the forms of the invention herein shown and described without departing from the spirit of the invention or the scope of the following claims.

I claim:

1. In combination with a vehicle attaching portion, a wheel having means to connect the same upon said portion to prevent rotation relative thereto, a bolt structure, means axially mounting the bolt structure upon the wheel for rotation against free axial movement thereon, an attaching member threaded upon said bolt structure for movement along the bolt structure upon rotation of the bolt structure relative to the wheel, and interengaging detent means upon said member and the attaching portion first mentioned to lock the wheel upon said vehicle attaching portion.

2. In combination with a vehicle attaching portion, a wheel having means to connect the same upon said portion to prevent rotation relative thereto, a bolt structure, means axially mounting the bolt structure upon the wheel against axial movement with respect to the wheel, an attaching member threaded upon said bolt structure for movement along the bolt structure upon rotation of the bolt structure relative to the wheel, said vehicle attaching portion having studs thereon provided with detent recesses and the wheel and attaching member having openings to receive said studs, and pivoted detents upon said attaching member for camming against the wheel to move into and out of the detent recesses as the bolt structure is rotated upon said wheel for moving said attaching member axially along the bolt.

3. In an automobile wheel construction the combination of a vehicle drum or flange adapted to detachably receive a wheel, said flange having an outer face provided with right-angled rigid studs having lateral detent recesses therein, said studs being provided in spaced relation around the axis of the wheel, a wheel plate having openings therein to receive the studs, an externally threaded bolt rotatably mounted centrally upon the wheel plate against free endwise movement thereon, a master plate threaded upon said bolt at the opposite side of the wheel plate with respect to the flange, and movable detents carried by said master plate for releasably engaging in the detent recesses of said studs.

4. In an automobile wheel construction the combination of a vehicle flange adapted to detachably receive a wheel, said flange having an outer face provided with a series of right-angled rigid studs provided with lateral detent recesses therein, said studs being in relatively spaced relation around the axis of the wheel, a wheel plate having openings therein to receive the studs in projecting relation therefrom, an externally threaded bolt rotatably mounted centrally upon the wheel plate against axial movement thereon, a master plate threaded upon said bolt at the opposite side of the wheel plate with respect to the flange, and movable detents carried by said master plate for releasably engaging in the detent recesses of said studs, said flange having another series of studs and the wheel plate and attaching plate having openings to receive said last mentioned studs.

5. In an automobile wheel construction the combination of an axle flange having at the outer face thereof a rigid stud extension provided with a lateral recess therein, a wheel having an opening to receive said stud, a master plate having an opening to also receive said stud and having a detent movably mounted thereupon for movement in a plane normal to the plane of the wheel, and means upon said wheel for moving the master plate towards the wheel at the opposite side of the wheel from the flange to cam the detent against said wheel plate into the recess of the stud for locking the wheel upon said flange.

6. An automobile wheel comprising an axle having a wheel attaching flange thereon provided at the outer surface thereof with a plurality of eccentrically positioned studs having recesses laterally therein, a wheel having a central plate provided with openings to releasably receive said studs, an attaching plate having openings to receive said studs at the outer side of the wheel plate with respect to said axle flange, detents pivoted upon said attaching plate for swinging in a plane normal to the wheel plane and having camming engagement with the outer surface of the wheel plate adjacent to the respective axle studs, and means carried by the wheel plate for moving said attaching plate towards and away from the wheel plate whereby to move said detents into and out of connecting engagement with respect to the recesses of said studs.

7. An automobile wheel comprising an axle having a wheel attaching flange thereon provided at the outer surface thereof with a plurality of eccentrically positioned studs having recesses laterally therein, a wheel having a central plate provided with openings to releasably receive said studs, an attaching plate having openings to receive said studs at the outer side of the wheel plate with respect to said axle flange, detents pivoted upon said attaching plate for swinging in a plane normal to the wheel plane and having camming engagement with the outer surface of the wheel plate adjacent to the respective axle studs, and means carried by the wheel plate for moving said attaching plate towards and away from the wheel plate whereby to move said detents into and out of connecting engagement with respect to the recesses of said studs, said last mentioned means being positioned centrally of the axle and consisting of a rotary bolt upon which the attaching plate is threaded.

8. In an automotive wheel construction the combination of a vehicle wheel securing flange having a plurality of right-angled relatively spaced transverse studs thereon each provided with a lateral recess therein, a wheel including a central portion provided with individual openings to receive said studs, an externally threaded bolt centrally mounted upon the central wheel portion for rotation against endwise movement thereon, an attaching plate threaded upon said bolt at the opposite side of the wheel plate from the said flange, and movable detents carried by said attaching plate having a movement normal to the plane thereof for interengagement with the recesses of said studs in order to lock the wheel upon said flange.

9. In a wheel attaching structure the combination with a wheel having transverse openings therethrough eccentric to the axis of the wheel, a bolt structure rotatably mounted upon the wheel axially thereof against axial movement with respect thereto, an attaching plate threaded upon said bolt having openings transversely therethrough adapted to align with the openings of the wheel plate, and detents movably mounted upon said attaching plate for extension into and out of the openings of the attaching plate upon relative axial movement of the attaching plate and wheel thru rotation of the bolt structure.

10. In a wheel construction the combination with an axle flange having rigid transversely extending studs eccentrically positioned upon the outer face thereof, said studs each having a lateral recess therein, a wheel member having a central portion provided with individual openings for fitting upon said studs, an externally threaded bolt rotatably mounted axially upon the wheel member at the outer side of the wheel member against axial movement thereon, an attaching member threaded upon said bolt at the outer side of the wheel member having individual openings therein for receiving the respective studs of the axle flange, and pivoted dogs upon said attaching member having a movement normal to the wheel plane for camming against the wheel member as the bolt is rotated to move the attaching member along the bolt for moving the dogs into and out of clamping engagement within the lateral recesses of said studs.

11. In a wheel construction the combination with an axle flange having rigid transversely extending studs on the outer face thereof eccentrically positioned upon said flange, said studs having lateral recesses therein, a wheel member having a central portion provided with openings for fitting upon said studs, an externally threaded bolt rotatably mounted axially upon the wheel member at the outer side of the wheel member, an attaching member threaded upon said bolt at the outer side of the wheel member having openings therein for receiving the studs of the axle flange, and pivoted dogs upon said attaching member having a movement normal to the wheel plane for camming against the wheel member as the bolt is rotated to move the attaching member along the bolt for moving the dogs into and out of clamping engagement within the lateral recesses of said studs, said studs being tapered and the companion openings of the attaching member being likewise tapered for snug socketing therein.

12. In a wheel construction the combination with an axle flange having a series of rigid transversely extending studs on the outer face thereof eccentrically positioned upon said flange, said studs having lateral recesses therein, a wheel member having a central portion provided with openings for fitting upon said studs, an externally threaded bolt rotatably mounted axially upon the wheel member at the outer side of the wheel member, an attaching member threaded upon said bolt at the outer side of the wheel member having openings therein for reeciving the studs of the axle flange, and pivoted dogs upon said attaching member having a movement normal to the wheel plane for camming against the wheel member as the bolt is rotated to move the attaching member along the bolt for moving the dogs into and out of clamping engagement with the lateral recesses of said studs, said axle flange having another series of transverse studs and the wheel attaching member having companion openings for receiving said studs.

13. In an automobile wheel construction the combination of a vehicle drum or flange adapted to detachably receive a wheel, said flange having an outer face provided with right-angled rigid studs having lateral detent recesses therein, said studs being provided in spaced relation around the axis of the wheel, a wheel plate having openings therein to receive the studs, an externally threaded bolt rotatably mounted centrally upon the wheel plate, means to limit endwise movement of the bolt upon said plate, a master plate threaded upon said bolt at the opposite side of the wheel plate for the flange, movable detents carried by said master plate for releasably engaging in the detent recesses of said studs, and a jamb nut threaded on said bolt for clamping against the outer side of the master plate.

14. An automobile wheel comprising an axle having a wheel attaching flange thereon provided at the outer surface thereof with a plurality of eccentrically positioned studs having recesses laterally therein, a wheel having a central plate provided with openings to receive said studs, a master plate having openings to receive said studs at the outer side of the wheel plate with respect to said axle flange, detents pivoted upon said master plate for swinging in a plane normal to the wheel plane and having camming engagement with the outer surface of the wheel plate adjacent to the axle studs, and means carried by the wheel plate for moving said master plate towards and away from the wheel plate whereby to move said detents into and out of connecting engagement with respect to the recesses of said studs, the studs being five in number and spaced from the axis of the wheel in substantially the same spaced relation as the attaching bolts of a conventional automotive vehicle wheel.

15. In an automobile wheel construction the combination of a vehicle flange, a wheel plate adapted to fit against the outer face of the vehicle flange, an externally threaded bolt rotatably mounted centrally upon said wheel plate, means to limit the endwise movement of the bolt upon said plate during rotation thereon, a master plate threaded upon said bolt at the opposite side of the wheel plate from the flange for movement therealong as the bolt is rotated relative to said wheel plate, and interengaging stud and detent means associated with said vehicle flange and master plate to releasably lock the wheel plate to the vehicle flange upon movement of the master plate towards said wheel plate as an incident of rotation of said bolt.

PATRICK A. TRAPP.

REFERENCES CITED

The following references are of record in the file of this patent:

UNITED STATES PATENTS

| Number | Name | Date |
|---|---|---|
| 2,029,866 | Haberl | Feb. 4, 1936 |

FOREIGN PATENTS

| Number | Country | Date |
|---|---|---|
| 18,929 | Great Britain | 1911 |
| 630,990 | Germany | Sept. 8, 1933 |
| 500,355 | Great Britain | Feb. 7, 1939 |
| 738,341 | France | Oct. 17, 1932 |